US012717341B2

(12) United States Patent
Hirose

(10) Patent No.: US 12,717,341 B2
(45) Date of Patent: Aug. 25, 2026

(54) SELF-POSITION ESTIMATION DEVICE

(71) Applicant: Hino Motors, Ltd., Hino (JP)

(72) Inventor: Yuichiro Hirose, Hino (JP)

(73) Assignee: Hino Motors, Ltd., Hino (JP)

( * ) Notice: Subject to any disclaimer, the term of this patent is extended or adjusted under 35 U.S.C. 154(b) by 194 days.

(21) Appl. No.: 18/547,726

(22) PCT Filed: Jan. 21, 2022

(86) PCT No.: PCT/JP2022/002201
§ 371 (c)(1),
(2) Date: Aug. 24, 2023

(87) PCT Pub. No.: WO2022/181138
PCT Pub. Date: Sep. 1, 2022

(65) Prior Publication Data

US 2024/0142993 A1 May 2, 2024

(30) Foreign Application Priority Data

Feb. 25, 2021 (JP) ................................ 2021-028396

(51) Int. Cl.
*G05D 1/246* (2024.01)
*G01S 17/89* (2020.01)

(52) U.S. Cl.
CPC .............. *G05D 1/246* (2024.01); *G01S 17/89* (2013.01)

(58) Field of Classification Search
CPC ....... G05D 1/246; G01S 17/89; G01S 7/4808; G01C 21/30

(Continued)

(56) References Cited

U.S. PATENT DOCUMENTS 11,568,563 B2 * 1/2023 Creaby ................ A01B 69/008
2014/0063248 A1 * 3/2014 Sakagami ............ G06V 20/588
348/148

(Continued)

FOREIGN PATENT DOCUMENTS

JP 7-71978 A 3/1995
JP 5407898 B2 2/2014

(Continued)

OTHER PUBLICATIONS

International Preliminary Report on Patentability and Written Opinion issued on Sep. 7, 2023 in PCT/JP2022/002201, 5 pages.

(Continued)

*Primary Examiner* — Anne Marie Antonucci
*Assistant Examiner* — Jodi Jones
(74) *Attorney, Agent, or Firm* — Oblon, McClelland, Maier & Neustadt, L.L.P.

(57) ABSTRACT

A self-position estimation device includes a peripheral object information acquisition unit acquiring peripheral object information, a storage unit storing map information and dynamic object information, a dynamic object determination unit, and a self-position estimation unit. The dynamic object information includes fixed portion information and movable portion information. The dynamic object determination unit determines whether or not the dynamic object exists around the moving body by collating the peripheral object information with the fixed portion information, when the dynamic object determination unit determines that the dynamic object exists around the moving body, the self-position estimation unit estimates the position of the moving body in the map information by excluding the portion corresponding to the dynamic object from the peripheral object information and collating the map information with the peripheral object information.

3 Claims, 6 Drawing Sheets

(58) Field of Classification Search
USPC .......... 701/446, 532, 300, 445, 468, 472, 28
See application file for complete search history.

(56) References Cited

U.S. PATENT DOCUMENTS

| | | | | |
|---|---|---|---|---|
| 2014/0168423 | A1* | 6/2014 | Koga | H04W 4/44<br>348/135 |
| 2016/0062361 | A1* | 3/2016 | Nakano | G05D 1/0088<br>701/25 |
| 2020/0019792 | A1* | 1/2020 | Sano | G06V 20/588 |
| 2021/0100156 | A1* | 4/2021 | Iwase | G01S 17/931 |

FOREIGN PATENT DOCUMENTS

| | | | |
|---|---|---|---|
| JP | 2020-4244 | A | 1/2020 |
| JP | 2020-34452 | A | 3/2020 |
| JP | 2020-34771 | A | 3/2020 |
| JP | 2020-34772 | A | 3/2020 |
| JP | 2020-125960 | A | 8/2020 |
| WO | WO 2020/115945 | A1 | 6/2020 |

OTHER PUBLICATIONS

International Search Report mailed on Mar. 1, 2022 in PCT/JP2022/002201 filed on Jan. 21, 2022 (2 pages).

* cited by examiner 2
1
3
PERIPHERAL OBJECT INFORMATION ACQUISITION UNIT
5
CONTROL UNIT
7
SELF-POSITION ESTIMATION UNIT
6
DYNAMIC OBJECT DETERMINATION UNIT
4
STORAGE UNIT
A
MAP INFORMATION
B
DYNAMIC OBJECT INFORMATION
b1
FIXED PORTION INFORMATION
b2
MOVABLE PORTION INFORMATION

SELF-POSITION ESTIMATION DEVICE

TECHNICAL FIELD

One aspect of the present invention relates to a self-position estimation device estimating a position of a moving body.

BACKGROUND ART

Patent Literature 1 describes a self-position certification device measuring a self position by using a CCD camera and a laser pointer.

CITATION LIST

Patent Literature

Patent Literature 1: Japanese Unexamined Patent Publication No. H07-071978

SUMMARY OF INVENTION

Technical Problem

In the field of autonomous driving and the like, self-position estimation is performed in technologies such as simultaneous localization and mapping (SLAM). In the SLAM, an object existing around a moving body is acquired as peripheral object information (laser point group), for example, by light detection and ranging (LiDAR), which is a type of laser radar. Then, the self-position of the moving body is estimated by collating the acquired peripheral object information with the map information (point group). However, when a dynamic object not included in the map information exists around the moving body, there is a possibility that the self-position of the moving body cannot be estimated by collating the map information with the peripheral object information. In other words, there is a problem in that the robustness against the dynamic object is low.

Herein, it is also conceivable to exclude the portion corresponding to the dynamic object from the peripheral object information and collate the map information with the peripheral object information. However, the dynamic object such as a dump truck has a movable portion that changes the form. For this reason, when the movable portion moves, it becomes difficult to estimate the portion corresponding to the dynamic object in the peripheral object information.

Therefore, it is an object of one aspect of the present invention to provide a self-position estimation device capable of improving the position estimation accuracy when a dynamic object exists around a moving body.

Solution to Problem

According to one aspect of the present invention, there is provided a self-position estimation device including: a peripheral object information acquisition unit acquiring peripheral object information, which is information about an object that exists around a moving body; a storage unit storing map information and dynamic object information that is information about a dynamic object; a dynamic object determination unit determining whether or not the dynamic object exists around the moving body; and a self-position estimation unit estimating a position of the moving body in the map information by collating the map information with the peripheral object information, in which the dynamic object information includes fixed portion information, which is information about a fixed portion of the dynamic object of which form does not change and movable portion information, which is information about a movable portion of the dynamic object of which form changes, in which the dynamic object determination unit determines whether or not the dynamic object exists around the moving body by collating the peripheral object information with the fixed portion information, in which, when the dynamic object determination unit determines that the dynamic object exists around the moving body, the self-position estimation unit estimates the position of the moving body in the map information by excluding a portion corresponding to the dynamic object from the peripheral object information and collating the map information with the peripheral object information.

This self-position estimation device determines whether or not a dynamic object exists around the moving body by collating the peripheral object information with the fixed portion information. For this reason, even when the movable portion of the dynamic object changes the form, it can be determined whether or not the dynamic object exists around the moving body. Then, when it is determined that the dynamic object exists around the moving body, the position of the moving body in the map information is estimated by excluding the portion corresponding to the dynamic object from the peripheral object information and collating the map information with the peripheral object information. For this reason, it is possible to improve the position estimation accuracy of the moving body when the dynamic object exists around the moving body.

The storage unit may store a plurality of pieces of dynamic object information having the same fixed portion information and different movable portion information. In this self-position estimation device, the storage unit stores a plurality of pieces of the dynamic object information having the same fixed portion information and different movable portion information. For this reason, when collating the map information and the peripheral object information, it is possible to exclude the portion corresponding to the dynamic object from the peripheral object information according to the form of the dynamic object. As a result, it is possible to further improve the position estimation accuracy of the moving body when a dynamic object exists around the moving body.

The peripheral object information acquisition unit may be a laser radar. In this self-position estimation device, the peripheral object information acquisition unit is a laser radar, so that the peripheral object information can be acquired with high accuracy.

Advantageous Effects of Invention

According to one aspect of the present invention, it is possible to improve the position estimation accuracy when the dynamic object exists around the moving body.

DESCRIPTION OF EMBODIMENTS

Figure 1:
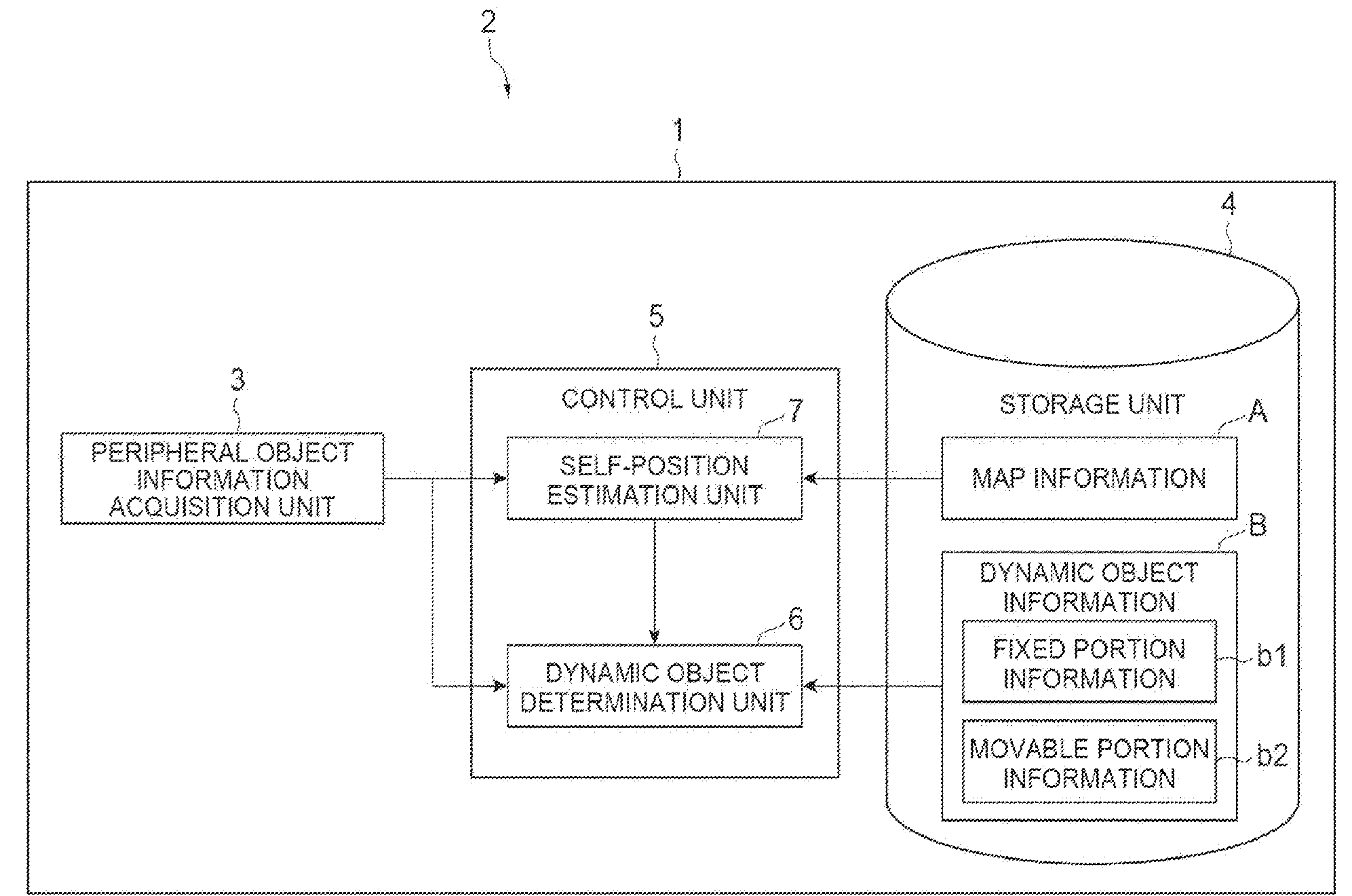
FIG. 1 is a block configuration diagram illustrating a self-position estimation device according to an embodiment.

Hereinafter, embodiments of the present invention will be described in detail with reference to the drawings. It is noted that the same or corresponding elements are denoted by the same reference numerals, and overlapping descriptions are omitted.

FIG. 1 is a block configuration diagram illustrating a self-position estimation device according to an embodiment. As illustrated in FIG. 1, a self-position estimation device 1 according to the present embodiment is a device mounted on a moving body 2 to estimate a position of the moving body 2. The moving body 2 on which the self-position estimation device is mounted is not particularly limited, but examples thereof include automobiles and motorcycles. The self-position estimation device 1 includes a peripheral object information acquisition unit 3, a storage unit 4, and a control unit 5.

The peripheral object information acquisition unit 3 acquires peripheral object information, which is information on an object existing around the moving body 2. As the peripheral object information acquisition unit 3, for example, a radar radar such as an LiDAR, a millimeter wave sensor, a camera, or the like can be used. In this embodiment, the peripheral object information acquisition unit 3 is described as being the LiDAR. The peripheral object information acquisition unit 3, which is an LiDAR, detects an object around the moving body 2 by using a laser beam. The peripheral object information acquisition unit 3 transmits the laser beam around the moving body 2 and receives the laser beam reflected by the object, so that the object existing around the moving body 2 is detected as a laser point group (LIDAR point group). This laser point group serves as the peripheral object information.

The storage unit 4 stores map information A and dynamic object information B. The map information A is information required for estimating the position of the moving body 2, such as the positions and shapes of buildings and the positions and shapes of roads. The map information A is information that can be collated with the peripheral object information, and is, for example, point group information that can be collated with the laser point group acquired as the peripheral object information by the peripheral object information acquisition unit 3. The dynamic object information B is information on the dynamic object which may be likely to exist around the moving body 2. The dynamic object information B is information that can be collated with the peripheral object information, and for example, is point group information that can be collated with the laser point group acquired as the peripheral object information by the peripheral object information acquisition unit 3.

Figure 2:
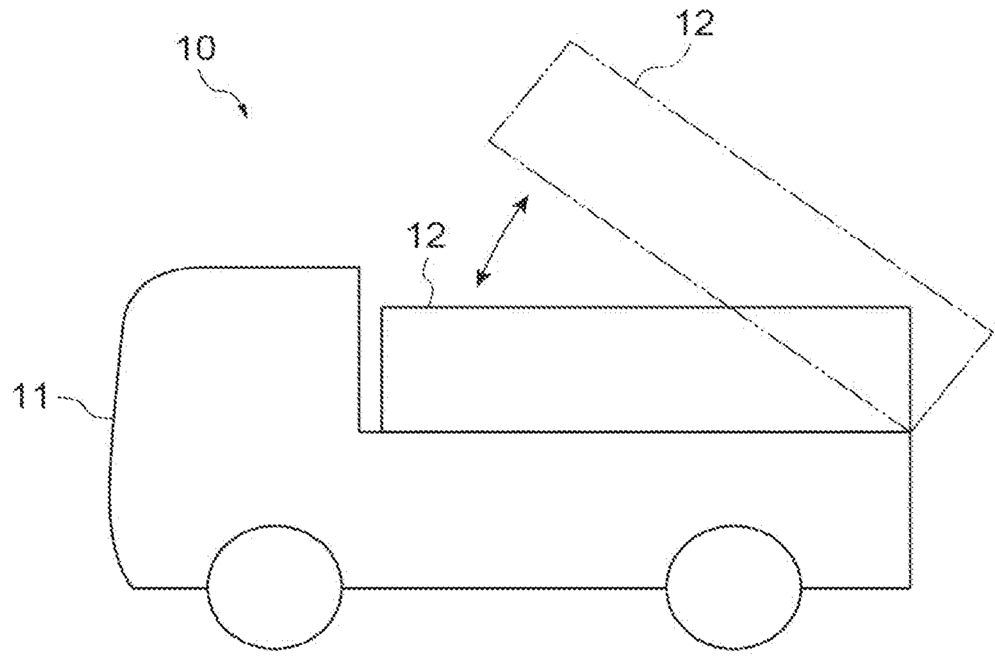
FIG. 2 is a schematic diagram describing a shape change of a movable object.

By the way, as illustrated in FIG. 2, a dynamic object 10 has a fixed portion 11 of which form does not change and a movable portion 12 of which form changes. For example, in a case of a dump truck, a vehicle body is the fixed portion 11, and a loading platform tilting with the vehicle body is the movable portion 12. In addition, in a case of a crane truck, a vehicle body is the fixed portion 11, and a crane portion that tilts and expands and contracts with respect to the vehicle body is the movable portion 12. In the case of an excavator, the vehicle body is the fixed portion 11, and the excavator portion that tilts and bends with respect to the vehicle body is the movable portion 12.

Therefore, the dynamic object information B has fixed portion information b1, which is information about the fixed portion 11 of the dynamic object 10 of which form does not change, and movable portion information b2, which is information about the movable portion 12 of the dynamic object of which form changes. The fixed portion information b1 and the movable portion information b2 are information that can be collated with the peripheral object information, and for example, the peripheral object information acquisition unit 3 is point group information that can be collated with the laser point group acquired as the peripheral object information.

Figure 3:
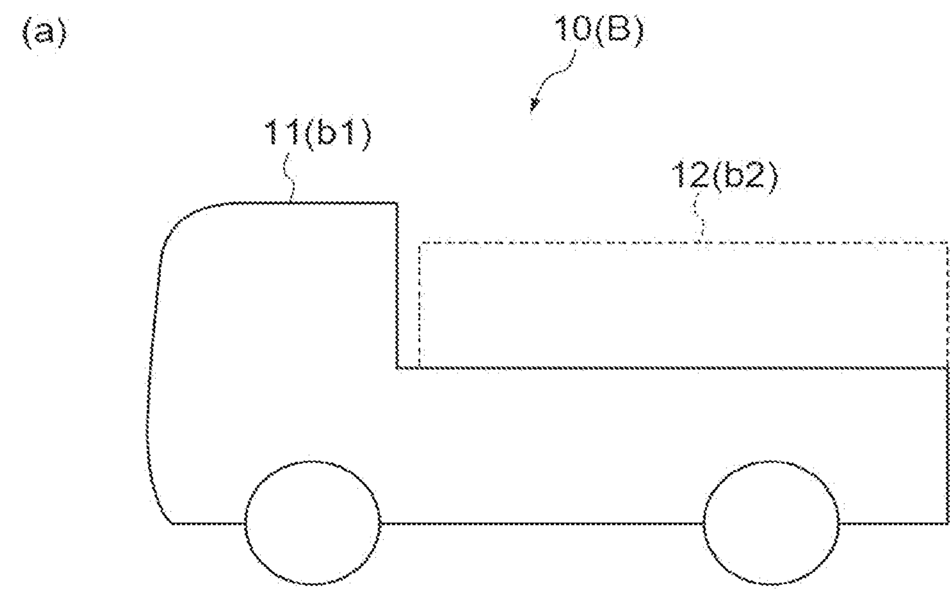
FIGS. 3(*a*) and 3(*b*) are schematic diagrams illustrating examples of dynamic object having different forms of movable portions.
Figure 3:
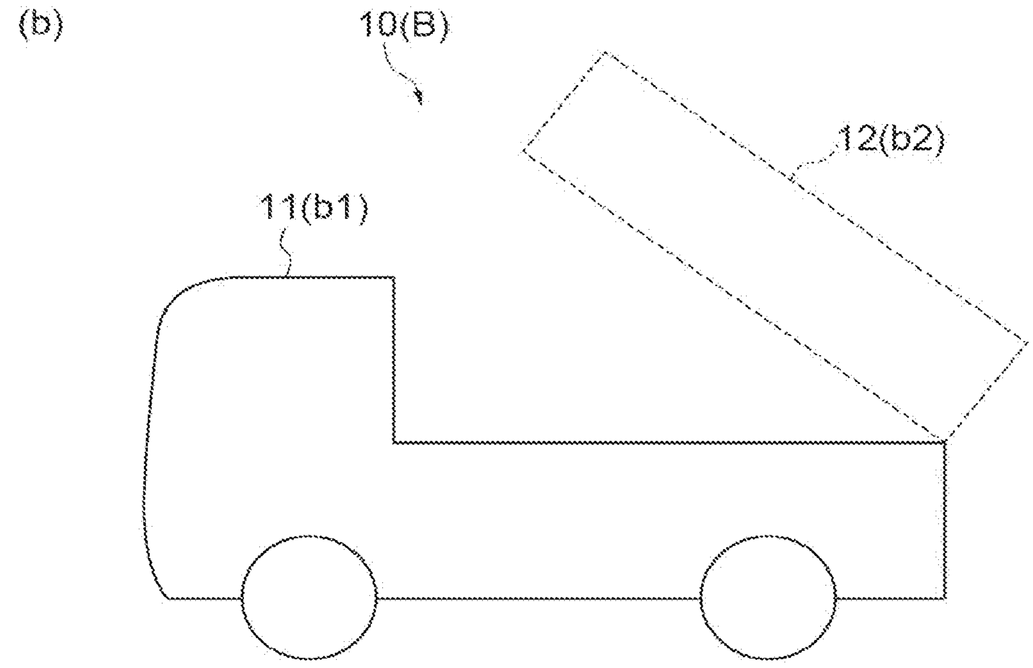

In addition, the storage unit 4 stores a plurality of pieces of the dynamic object information B having the same fixed portion information b1 and different movable portion information b2. For example, the storage unit 4 stores the dynamic object information B, which is information about the dynamic object 10 illustrated in FIG. 3(*a*) and the dynamic object information B, which is information about the dynamic object 10 illustrated in FIG. 3(*b*). In FIGS. 3(*a*) and 3(*b*), the fixed portion 11 of the dynamic object 10 is indicated by a solid line portion, and the movable portion 12 of the dynamic object 10 is indicated by a broken line portion. In FIGS. 3(*a*) and 3(*b*), a dump truck is indicated as the dynamic object 10, the vehicle body of the dump truck is the fixed portion 11, and the loading platform of the dump truck is the movable portion 12. The dynamic object information B illustrated in FIG. 3(*a*) and the dynamic object information B illustrated in FIG. 3(*b*) have the same movable portion information b1, which is information of the vehicle body which is the fixed portion 11, and the different movable portion information b2, which is information of the loading platform which is the movable portion 12. Specifically, the movable portion information b2 of the dynamic object information B illustrated in FIG. 3(*a*) is information of the loading platform of the form not tilted with respect to the vehicle body, and the movable portion information b2 of the dynamic object information B illustrated in FIG. 3(*b*) is information of the loading platform tilted with respect to the vehicle body.

The control unit 5 is an electronic control unit (ECU) having a CPU, a ROM, a RANI, and the like. In the control unit 5, programs stored in the ROM are loaded into the RAM and executed by the CPU, so that various controls are executed. The control unit 5 may be configured with a single electronic control unit, or may be configured with a plurality of electronic control units. The control unit 5 has a dynamic object determination unit 6 and a self-position estimation unit 7. The dynamic object determination unit 6 and the self-position estimation unit 7 may be configured with the same electronic control unit or may be configured with different electronic control units.

The dynamic object determination unit 6 determines whether or not the dynamic object 10 exists around the moving body 2. In other words, the dynamic object determination unit 6 determines whether or not the dynamic object 10 exists around the moving body 2 by collating the peripheral object information acquired by the peripheral object information acquisition unit 3 with the fixed portion information b1 of the dynamic object information B stored in the storage unit 4. For example, the fixed portion information b1 of all the dynamic object information B stored in the storage unit 4 is collated with the peripheral object information acquired by the peripheral object information acquisition unit 3 by using a known pattern matching technique or the like. Then, when at least one portion corresponding to the fixed portion information b1 is found in the peripheral object information, it is determined that the dynamic object 10 exists around the moving body 2. On the other hand, when no portion corresponding to any of the fixed portion information b1 is found in the peripheral object information, it is determined that the dynamic object 10 does not exist around the moving body 2. Then, the dynamic object determination unit 6 transmits the determination result to the self-position estimation unit 7.

The self-position estimation unit 7 estimates the position of the moving body 2 in the map information A by collating the map information A with the peripheral object information. For example, the position of the moving body 2 in the map information A is estimated by collating the peripheral object information acquired by the peripheral object information acquisition unit 3 with the map information A stored in the storage unit 4 by using a known pattern matching technique or the like.

Figure 4:
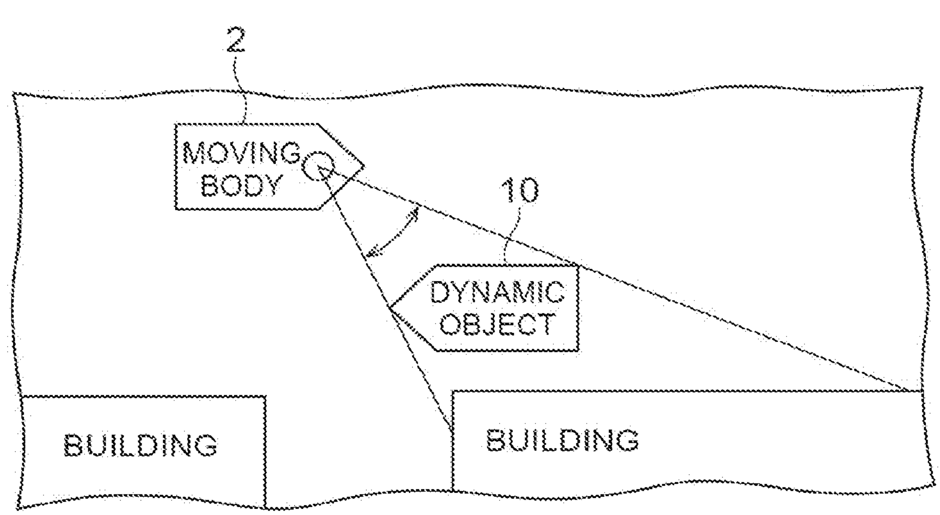
FIG. 4 is a schematic diagram illustrating an example in which the dynamic object exists around the moving body.
Figure 5:
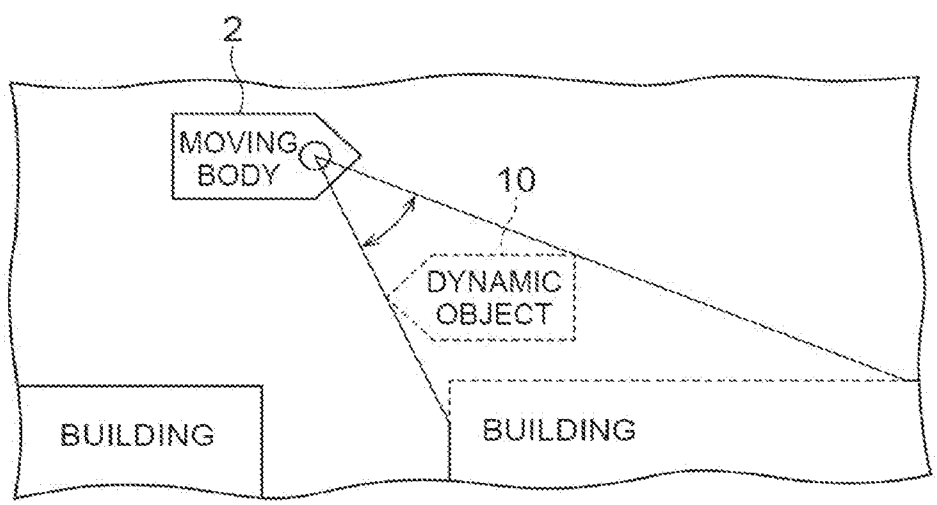
FIG. 5 is a schematic diagram illustrating an example in which the dynamic object existing around the moving body is excluded.

At this time, as illustrated in FIG. 4, when the dynamic object 10 exists around the moving body 2, it is difficult to estimate the position of the moving body 2 in the map information A by collating the map information A with the peripheral object information. Therefore, when the dynamic object determination unit 6 determines that the dynamic object 10 exists around the moving body 2, as illustrated in FIG. 5, the self-position estimation unit 7 estimates the position of the moving body 2 in the map information A by excluding the portion corresponding to the dynamic object 10 from the peripheral object information and collating the map information A with the peripheral object information. That is, when the dynamic object determination unit 6 determines that the dynamic object 10 exists around the moving body 2, the dynamic object determination unit 6 estimates the position of the moving body 2 in the map information A by excluding the portions of the dynamic object 10 corresponding to both the fixed portion 11 and the movable portion 12 from the peripheral object information and collating the map information A with the peripheral object information. Such estimation can be performed by, for example, generating the peripheral object information for the collating by excluding the portion corresponding to the dynamic object 10 from the peripheral object information and collating the generated peripheral object information for the collating with the map information A.

Figure 6:
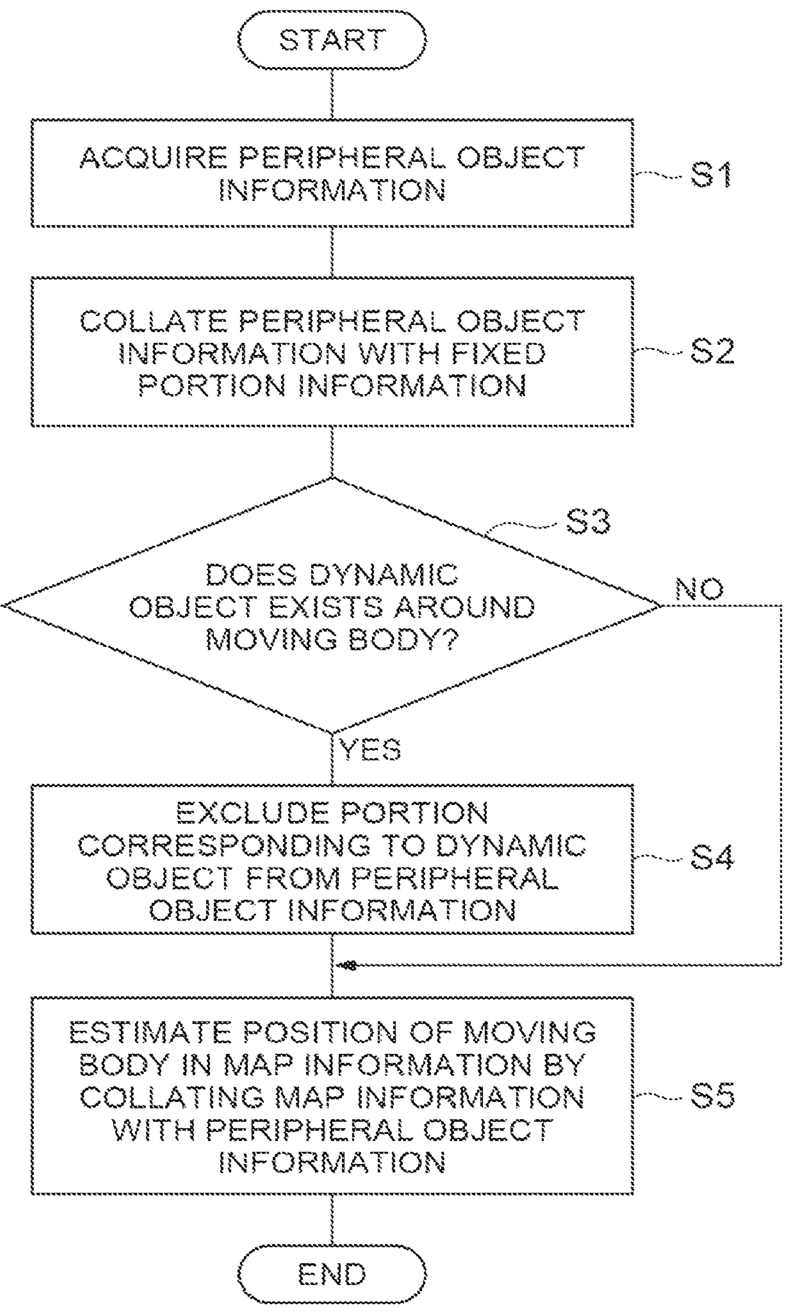
FIG. 6 is a flowchart illustrating a processing operation of a self-position estimation device.

Next, an example of the processing operation of the self-position estimation device 1 will be described with reference to FIG. 6.

First, the peripheral object information acquisition unit 3 acquires the peripheral object information, which is information about the object existing around the moving body 2 (step S1).

Next, the dynamic object determination unit 6 collates the peripheral object information acquired by the peripheral object information acquisition unit 3 with the fixed portion information b1 of the dynamic object information B stored in the storage unit 4 (step S2) and determines whether or not the dynamic object 10 exists around the moving body 2 (step S3).

When it is determined that the dynamic object 10 does not exist around the moving body 2 (step S3: NO), the self-position estimation unit 7 estimates the position of the moving body 2 in the map information A by collating the map information A with the peripheral object information (step S5).

On the other hand, when it is determined that the dynamic object 10 exists around the moving body 2 (step S3: YES), the self-position estimation unit 7 excludes the portion corresponding to the dynamic object 10 from the peripheral object information (step S4) and estimates the position of the moving body 2 in the map information A by collating the map information A with the peripheral object information (step S5).

As described above, the self-position estimation device 1 according to the present embodiment determines whether or not the dynamic object 10 exists around the moving body 2 by collating the peripheral object information with the fixed portion information b1. For this reason, even when the movable portion 12 of the dynamic object 10 changes the form, it can be determined whether or not the dynamic object 10 exists around the moving body 2. Then, when it is determined that the dynamic object 10 exists around the moving body 2, the portion corresponding to the dynamic object 10 is excluded from the peripheral object information, and the position of the moving body 2 in the map information A is estimated by collating the map information A with the peripheral object information. Therefore, it is possible to improve the position estimation accuracy of the moving body 2 when the dynamic object 10 exists around the moving body 2.

In addition, the storage unit 4 stores a plurality of pieces of the dynamic object information B having the same fixed portion information b1 and different movable portion information b2. For this reason, when collating the map information A and the peripheral object information, it is possible to exclude the portion corresponding to the dynamic object 10 from the peripheral object information according to the form of the dynamic object 10. Accordingly, it is possible to further improve the position estimation accuracy of the moving body 2 when the dynamic object 10 exists around the moving body 2.

In addition, since the peripheral object information acquisition unit 3 is a laser radar, it is possible to acquire the peripheral object information with high accuracy.

Although the embodiments of the present invention have been described above, the present invention is not limited to the above-described embodiments, and may be modified or applied to other things within the scope of not changing the spirit of each of the claims. For example, in the above-described embodiment, the storage unit stores two pieces of the dynamic object information having the same fixed portion information and different movable portion information, and when the change in the form of the movable portion is complicated, three or more pieces of the dynamic object information in the storage unit may be stored.

REFERENCE SIGNS LIST

1: self-position estimation device, 2: moving body, 3: peripheral object information acquisition unit, 4: storage unit, 5: control unit, 6: dynamic object determination unit, 7: self-position estimation unit, 10: dynamic object, 11: fixed portion, 12: movable portion, A: map information, B: dynamic object information, b1: fixed portion information, b2: movable portion information.

The invention claimed is:

1. A self-position estimation device, comprising:

a peripheral object information acquisition unit acquiring peripheral object information using a laser radar, which is information about an object that exists around a moving body;

a memory storing map information and dynamic object information that is information about a dynamic object; and circuitry configured to determine whether or not the dynamic object exists around the moving body, and estimate a position of the moving body in the map information by collating the map information with the peripheral object information, wherein the dynamic object information includes fixed portion information, which is information about a fixed portion of the dynamic object of which form does not change and movable portion information, which is information about a movable portion of the dynamic object of which form changes, wherein the circuitry determines whether or not the dynamic object exists around the moving body by collating the peripheral object information with the fixed portion information, and wherein, when the circuitry determines that the dynamic object exists around the moving body, the circuitry estimates the position of the moving body in the map information by excluding a portion corresponding to the dynamic object from the peripheral object information and collating the map information with the peripheral object information.

2. The self-position estimation device according to claim 1, wherein the memory stores a plurality of pieces of dynamic object information having same fixed portion information and different movable portion information.

3. The self-position estimation device according to claim 1, wherein the fixed portion corresponds to a body of a vehicle and the movable portion corresponds to a movable loading platform of the vehicle.

* * * * *